(12) United States Patent
Geneix et al.

(10) Patent No.: US 12,234,009 B2
(45) Date of Patent: Feb. 25, 2025

(54) ROTARY WING AIRCRAFT WITH AT LEAST TWO ROTORS AND A PROPULSION UNIT

(71) Applicants: AIRBUS HELICOPTERS, Marignane (FR); AIRBUS HELICOPTERS DEUTSCHLAND GMBH, Donauworth (DE)

(72) Inventors: Jerome Geneix, Miramas le Vieux (FR); Mikolaj Luszczynski, Lodz (PL)

(73) Assignees: AIRBUS HELICOPTERS, Marignane (FR); AIRBUS HELICOPTERS DEUTSCHLAND GMBH, Donauworth (DE)

( * ) Notice: Subject to any disclaimer, the term of this patent is extended or adjusted under 35 U.S.C. 154(b) by 42 days.

(21) Appl. No.: 17/989,077

(22) Filed: Nov. 17, 2022

(65) Prior Publication Data
US 2023/0192279 A1   Jun. 22, 2023

(30) Foreign Application Priority Data

Dec. 16, 2021  (EP) .................................... 21315280

(51) Int. Cl.
*B64C 27/30* (2006.01)
*B64C 27/12* (2006.01)
(Continued)

(52) U.S. Cl.
CPC .............. B64C 27/26 (2013.01); *B64C 27/12* (2013.01); *B64C 27/30* (2013.01);
(Continued)

(58) Field of Classification Search
CPC ......... B64C 27/12; B64C 27/22; B64C 27/26; B64C 29/0025; B64D 35/00; B64D 35/024
See application file for complete search history.

(56) References Cited

U.S. PATENT DOCUMENTS 3,693,910 A * 9/1972 Aldi ..................... B64C 27/30
416/143
12,040,669 B1 * 7/2024 Chong ................... H02K 1/145
(Continued)

FOREIGN PATENT DOCUMENTS

| CN | 107264794 B | 7/2019 | |
| EP | 3882132 A1 * | 9/2021 | ........... B64C 11/303 |
| KR | 20090054027 A * | 5/2009 | |

OTHER PUBLICATIONS

European Search Report for European Application No. EP 21315280. 4, Completed by the European Patent Office, Dated Jul. 1, 2022, 10 pages.

*Primary Examiner* — Joshua J Michener
*Assistant Examiner* — Ryan Andrew Yankey
(74) *Attorney, Agent, or Firm* — BROOKS KUSHMAN P.C.

(57) ABSTRACT

A rotary wing aircraft that extends along a roll axis between a nose region and an aft region, comprising: at least one first single-blade rotor and at least one second single-blade rotor which are spaced apart from each other along the roll axis; at least one first electric machine and at least one second electric machine which are at least configured to drive in motor mode the at least one first single-blade rotor and the at least one second single-blade rotor for generating lift in hover condition of the rotary wing aircraft; at least one propulsion device that is at least configured to generate forward thrust in forward flight condition of the rotary wing aircraft; and a fixed-wing arrangement that is at least configured to provide lift in the forward flight condition.

19 Claims, 5 Drawing Sheets

(51) Int. Cl.
*B64C 27/26* (2006.01)
*B64C 29/00* (2006.01)
*B64D 35/024* (2024.01)
*H01M 10/46* (2006.01)
*H02K 7/14* (2006.01)

(52) U.S. Cl.
CPC ........ *B64C 29/0025* (2013.01); *B64D 35/024* (2024.01); *H01M 10/46* (2013.01); *H02K 7/14* (2013.01); *B60L 2200/10* (2013.01); *H01M 2220/20* (2013.01)

(56) References Cited

U.S. PATENT DOCUMENTS

| | | | |
|---|---|---|---|
| 2010/0086404 A1* | 4/2010 | Thomassey | B64C 27/14 |
| | | | 416/34 |
| 2015/0114768 A1* | 4/2015 | Doleschel | F16D 55/40 |
| | | | 188/72.3 |
| 2016/0052626 A1* | 2/2016 | Vander Mey | |
| 2018/0222579 A1* | 8/2018 | Simon | B64C 27/473 |
| 2019/0084684 A1* | 3/2019 | Eller | B64C 29/0025 |
| 2020/0324886 A1 | 10/2020 | Gilbert | |
| 2021/0011493 A1 | 1/2021 | Simon | |
| 2023/0144699 A1* | 5/2023 | Kipnis | B60L 53/00 |
| | | | 244/2 |
| 2023/0264823 A1* | 8/2023 | Abron | |

* cited by examiner

ROTARY WING AIRCRAFT WITH AT LEAST TWO ROTORS AND A PROPULSION UNIT

CROSS-REFERENCE TO RELATED APPLICATIONS

This application claims priority to European patent application No. EP 21315280.4 filed on Dec. 16, 2021, the disclosure of which is incorporated in its entirety by reference herein.

TECHNICAL FIELD

The present disclosure relates to a rotary wing aircraft that extends along a roll axis between a nose region and an aft region and that comprises at least one first single-blade rotor and at least one second single-blade rotor which are spaced apart from each other along the roll axis and which are provided for generating lift in hover condition of the rotary wing aircraft, at least one propulsion device that is at least configured to generate forward thrust in forward flight condition of the rotary wing aircraft, and a fixed-wing arrangement that is at least configured to provide lift in the forward flight condition. The present disclosure further relates to a method of operating such a rotary wing aircraft.

BACKGROUND

In such a rotary wing aircraft, the single-blade rotors may only be used for vertical take-off and landing, i.e., for generating lift in hover condition of the rotary wing aircraft. In other words, the single-blade rotors may merely be used to accomplish lifting duties during vertical take-off and landing without accomplishing any propulsive duties. The propulsive duties, in turn, may be accomplished by the propulsion device, such as a propeller, which may be provided to off-load the single-blade rotors from such propulsive duties and to generate forward thrust in forward flight condition of the rotary wing aircraft.

More particularly, the single-blade rotors may be stopped completely in the forward flight condition and the lifting duties may be accomplished by the fixed-wing arrangement of such a rotary wing aircraft. Furthermore, in order to enable the rotary wing aircraft to travel with a comparatively high forward speed, the stopped single-blade rotors may be arranged in a position with minimum aerodynamic drag. For instance, respective single rotor blades of the stopped single-blade rotors may be aligned with the roll axis of the rotary wing aircraft, i.e., oriented longitudinally relative to the rotary wing aircraft's fuselage.

The document US 2018/0222579 A1 describes such a rotary wing aircraft that extends along a roll axis between a nose region and an aft region and that may travel at a comparatively high forward speed. The rotary wing aircraft comprises first and second single-blade rotors which are offset, i.e., spaced apart from each other along the roll axis, a propulsion device, such as a pusher or puller propeller, which is configured to generate forward thrust in forward flight condition of the rotary wing aircraft, and a fixed-wing arrangement that is configured to provide lift in the forward flight condition. The first and second single-blade rotors are stopped in forward flight condition of the rotary wing aircraft and their respective single rotor blades are oriented longitudinally towards the aft region, while counterweights associated with the respective single rotor blades are directed towards the nose region.

In hover condition of the rotary wing aircraft of document US 2018/0222579 A1, the first and second single-blade rotors are driven by a main engine. During a transition phase from hover condition to forward flight condition, the first and second single-blade rotors are declutched, leaving the first and second single-blade rotors to continue turning freely, with rotation being braked by an associated brake, and then the respective single rotor blades are moved into a forward flight position by an electric motor. The pusher or puller propeller is driven in the forward flight condition by the main engine and may be driven in the transition phase by a low power motor that is declutchable in the forward flight condition. In other words, the power from the main engine is transmitted in full to the pusher or puller propeller in the forward flight condition in order to propel the rotary wing aircraft at a comparatively high forward speed.

Nevertheless, this rotary wing aircraft requires provision of several clutches for clutching/declutching the main engine, as well as a separate brake for actively braking rotation of the first and second single-blade rotors, which results in a comparatively high overall system complexity. Such clutches and the separate brake are, however, comparatively heavy and expensive. Furthermore, such clutches and the separate brake are excessively liable to wear.

SUMMARY

It is, therefore, an object of the present disclosure to provide a new rotary wing aircraft that is equipped with first and second single-blade rotors which may be stopped in forward flight condition of the rotary wing aircraft, wherein the rotary wing aircraft comprises a drive system with a simplified overall architecture that allows to stop the first and second single-blade rotors securely and reliably.

This object is solved by a rotary wing aircraft that comprises the features of claim 1. More specifically, according to the present disclosure a rotary wing aircraft is provided that extends along an associated roll axis between a nose region and an aft region and that comprises at least one first single-blade rotor and at least one second single-blade rotor which are spaced apart from each other along the roll axis, at least one first electric machine and at least one second electric machine which are at least configured to drive in motor mode the at least one first single-blade rotor and the at least one second single-blade rotor for generating lift in hover condition of the rotary wing aircraft, at least one propulsion device that is at least configured to generate forward thrust in forward flight condition of the rotary wing aircraft, a fixed-wing arrangement that is at least configured to provide lift in the forward flight condition of the rotary wing aircraft, and a flight control system. The flight control system is configured to control, in a transition phase from the hover condition to the forward flight condition, the at least one propulsion device for generating forward thrust, and the at least one first electric machine and the at least one second electric machine to operate in a closed loop configuration with the at least one first single-blade rotor and the at least one second single-blade rotor for braking the at least one first single-blade rotor and the at least one second single-blade rotor down to a rotation speed close to zero.

Advantageously, operating the at least one first electric machine and the at least one second electric machine in a closed loop configuration with the at least one first single-blade rotor and the at least one second single-blade rotor for braking the at least one first single-blade rotor and the at least one second single-blade rotor down to a rotation speed close to zero reliably ensures an efficient and fast rotor stop in the transition phase from the hover condition to the forward flight condition. More particularly, the at least one first single-blade rotor and the at least one second single-blade rotor may be stopped without any significant heat generation and without the need for a dedicated brake and/or any other conventionally additionally required system component, such as a hydraulic retarder and so on. Thus, additional weight and a requirement for additional space implied by such a dedicated brake and/or any other conventionally additionally required system component may be avoided. Moreover, during stopping of the at least one first single-blade rotor and the at least one second single-blade rotor electrical energy may beneficially be recuperated.

More specifically, the inventive rotary wing aircraft is configured to use the at least one first electric machine and the at least one second electric machine for driving and braking the at least one first single-blade rotor and the at least one second single-blade rotor. Preferably, when the transition phase from the hover condition to the forward flight condition is initiated and the lift duties are accomplished by the fixed-wing arrangement, i.e., when the fixed-wing arrangement generates sufficient lift load, the at least one first electric machine and the at least one second electric machine start to operate in the closed loop configuration with the at least one first single-blade rotor and the at least one second single-blade rotor.

In the closed loop configuration, e.g., the at least one second electric machine is operated in generator mode, i.e., acting as electric generator. Respectively recuperated energy is preferably the only energy used to drive the at least one first electric machine that is operated in motor mode, i.e., acting as an electric motor. In other words, the at least one first electric machine is driven by the at least one second electric machine. As a result, kinematic energy accumulated in the closed loop configuration is dissipated to the air by the aerodynamic drag of the at least one first single-blade rotor and the at least one second single-blade rotor by the efficiency of all respective mechanical components.

Preferably at the end of the transition phase, i.e., when a respective rotation speed of the at least one first single-blade rotor and the at least one second single-blade rotor is approaching zero (rotor speed indicators), the operation in the closed loop configuration is deactivated and the at least one first electric machine and the at least one second electric machine are used to position the single-blades of the at least one first single-blade rotor and the at least one second single-blade rotor in an associated final position, preferentially aligned (backwards) with a respective fuselage axis, i.e., roll axis of the rotary wing aircraft. In this associated final position, the at least one first single-blade rotor and the at least one second single-blade rotor are preferably locked by a suitable locking unit.

According to some aspects, the at least one first single-blade rotor comprises a first single rotor blade and the at least one second single-blade rotor comprises a second single rotor blade, wherein the flight control system is further configured to align the first single rotor blade and the second single rotor blade with the roll axis, after braking the at least one first single-blade rotor and the at least one second single-blade rotor down to the rotation speed close to zero.

According to some aspects, the flight control system is further configured to activate a locking unit for locking the first single rotor blade and the second single rotor blade in the forward flight condition in an aligned position, after aligning the first single rotor blade and the second single rotor blade with the roll axis.

According to some aspects, the rotary wing aircraft further comprises at least one first rotor gearbox, at least one second rotor gearbox, and a synchronizing shaft, wherein the at least one first single-blade rotor is adapted to be driven via the at least one first rotor gearbox, the at least one second single-blade rotor is adapted to be driven via the at least one second rotor gearbox, and the synchronizing shaft is arranged between the at least one first rotor gearbox and the at least one second rotor gearbox for synchronizing counter-rotation of the at least one first single-blade rotor and the at least one second single-blade rotor.

According to some aspects, the locking unit is mounted to the synchronizing shaft for locking the synchronizing shaft in the forward flight condition in the aligned position of the first single rotor blade and the second single rotor blade.

According to some aspects, the flight control system is configured to control, in the transition phase, the at least one first electric machine for operation in the motor mode and the at least one second electric machine for operation in generator mode.

According to some aspects, the at least one second electric machine is configured to operate, in the transition phase, in the generator mode for generating electrical energy from rotation of the at least one second rotor.

According to some aspects, the flight control system is configured to control driving of the at least one first electric machine in the motor mode with the generated electrical energy from the at least one second electric machine operating in the generator mode.

According to some aspects, the rotary wing aircraft further comprises at least one thermal engine and at least one third electric machine that is drivable using mechanical energy generated by the at least one thermal engine.

According to some aspects, the flight control system is configured to control, in the hover condition, the at least one third electric machine for operation in generator mode for generation of electrical energy and supply of the generated electrical energy to the at least one first electric machine and the at least one second electric machine.

According to some aspects, the flight control system is configured to control, in the transition phase and the forward flight condition, the at least one third electric machine for operation in motor mode for driving the at least one propulsion device.

According to some aspects, the rotary wing aircraft further comprises a battery unit, wherein the flight control system is configured to control, in the transition phase, charging of the battery unit with electrical energy generated by the at least one second electric machine operating in the generator mode.

According to some aspects, the flight control system is configured to control, in the forward flight condition, supply of electrical energy from the battery unit to the at least one third electric machine operating in the motor mode in case of a failure of the thermal engine.

According to some aspects, the at least one propulsion device comprises at least one propeller.

The present disclosure further provides a method of operating a rotary wing aircraft that extends along a roll axis between a nose region and an aft region and that comprises at least one first single-blade rotor and at least one second single-blade rotor which are spaced apart from each other along the roll axis, at least one first electric machine and at least one second electric machine which are at least configured to drive in motor mode the at least one first single-blade rotor and the at least one second single-blade rotor for generating lift in hover condition of the rotary wing aircraft, at least one propulsion device that is at least configured to generate forward thrust in forward flight condition of the rotary wing aircraft, a fixed-wing arrangement that is at least configured to provide lift in the forward flight condition of the rotary wing aircraft, and a flight control system. The method comprises, in a transition phase from the hover condition to the forward flight condition, the steps of controlling the at least one propulsion device for generating forward thrust, and controlling the at least one first electric machine and the at least one second electric machine to operate in a closed loop configuration with the at least one first single-blade rotor and the at least one second single-blade rotor for braking the at least one first single-blade rotor and the at least one second single-blade rotor down to a rotation speed close to zero.

BRIEF DESCRIPTION OF THE DRAWINGS

Preferred embodiments of the disclosure are outlined by way of example in the following description with reference to the attached drawings. In these attached drawings, identical or identically functioning components and elements are labelled with identical reference numbers and characters and are, consequently, only described once in the following description.

DETAILED DESCRIPTION

Figure 1:
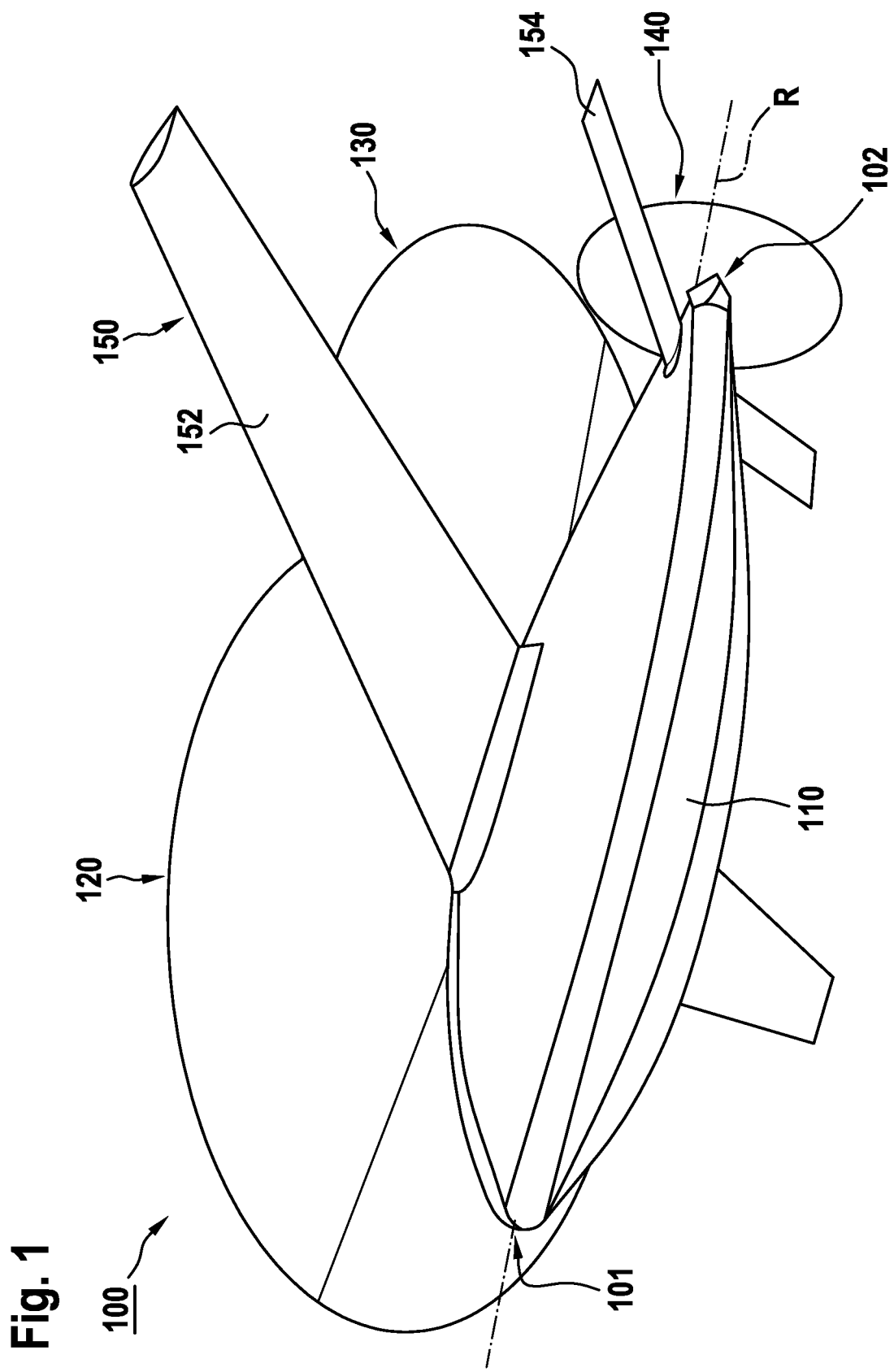
FIG. 1 shows a perspective view of a rotary wing aircraft in hover condition with two single-blade rotors, a propulsion device, and a fixed-wing arrangement according to the present disclosure.

FIG. 1 shows a rotary wing aircraft 100 with a fuselage 110 in hover condition. Illustratively, the rotary wing aircraft 100 extends between a nose region 101 and an aft region 102 along a roll axis R which corresponds to a longitudinal axis of the fuselage 110.

The rotary wing aircraft 100 comprises at least one first single-blade rotor 120 and at least one second single-blade rotor 130 which are at least configured to generate lift in hover condition of the rotary wing aircraft 100. The at least one first single-blade rotor 120 and the at least one second single-blade rotor 130 are illustratively spaced apart from each other along the roll axis R.

By way of example, the rotary wing aircraft 100 comprises only one first single-blade rotor which forms the at least one first single-blade rotor 120 and only one second single-blade rotor which forms the at least one second single-blade rotor 130. Moreover, the first single-blade rotor is positioned closer to the nose region 101 and the second single-blade rotor is positioned closer to the aft region 102. Therefore, the at least one first single-blade rotor 120 is referred to hereinafter as "the front rotor 120" and the at least one second single-blade rotor 130 is referred to hereinafter as "the rear rotor 130", for simplicity and brevity.

Furthermore, the rotary wing aircraft 100 comprises at least one propulsion device 140 that is at least configured to generate forward thrust in forward flight condition of the rotary wing aircraft 100. Preferably, the at least one propulsion device 140 comprises at least one propeller 142. By way of example, the at least one propulsion device 140 comprises only one propeller 142 so that reference is made hereinafter to "the propeller 142" by way of example, for simplicity and brevity.

The propeller 142 is illustratively embodied as a pusher propeller. However, the propeller 142 may alternatively be embodied as a puller propeller. Furthermore, the propeller 142 is located in the aft region 102. However, a respective type, number and/or arrangement of suitable propellers may be selected in an application- and aircraft-specific manner and falls into the common knowledge of the person skilled in the art, so that a more detailed description thereof may be omitted for brevity and conciseness.

Illustratively, the rotary wing aircraft 100 further comprises a fixed-wing arrangement 150 that is at least configured to provide lift in the forward flight condition of the rotary wing aircraft 100. By way of example, the fixed-wing arrangement 150 comprises laterally arranged rear wings 154 which are positioned close to the aft region 102 and laterally arranged front wings 152 which are positioned closer to the front region 101.

As described above, the rotary wing aircraft 100 is illustrated in hover condition. Thus, only components that are required in the hover condition are illustrated in more detail, while illustration of other components is omitted, for simplicity and clarity of the drawing. For instance, neither the fuselage 110 is illustrated in greater detail for showing e.g., respective doors and windows, nor a possible landing gear, which may be a wheel-type landing gear or a skid-type landing gear mounted to the fuselage 110, is shown, and so on.

Figure 2:
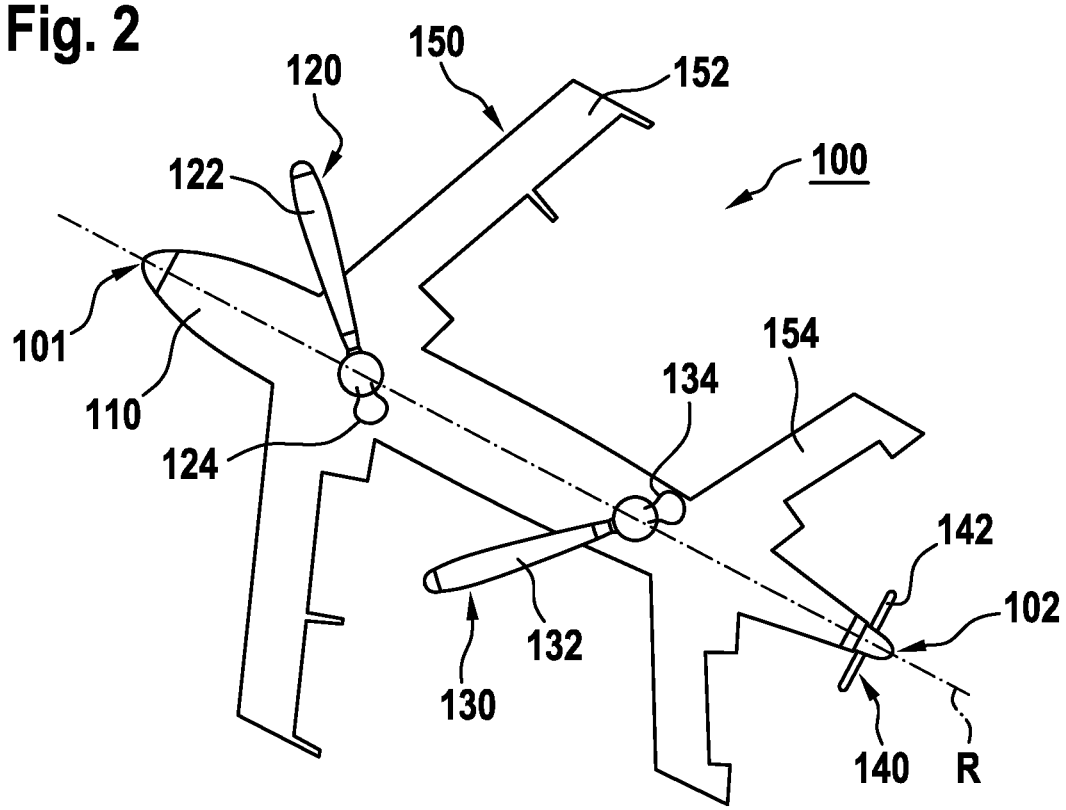
FIG. 2 shows a top view of the rotary wing aircraft of FIG. 1.

FIG. 2 shows the rotary wing aircraft 100 of FIG. 1 with the front rotor 120, the rear rotor 130, the propeller 142, the front wings 152, and the rear wings 154. The front rotor 120 preferably comprises a single rotor blade 122 with a counterweight 124, and the rear rotor 130 preferably comprises a single rotor blade 132 with a counterweight 134.

Similar to the illustration of FIG. 1, the rotary wing aircraft 100 is shown in the hover condition in FIG. 2. In the hover condition, the front rotor 120 and the rear rotor 130 are preferably counterrotating such that respective torques generated by the front rotor 120 and the rear rotor 130 are oppositely directed and, thus, compensate each other. Accordingly, there is no need to provide an additional anti-torque device with the rotary wing aircraft 100.

Figure 3:
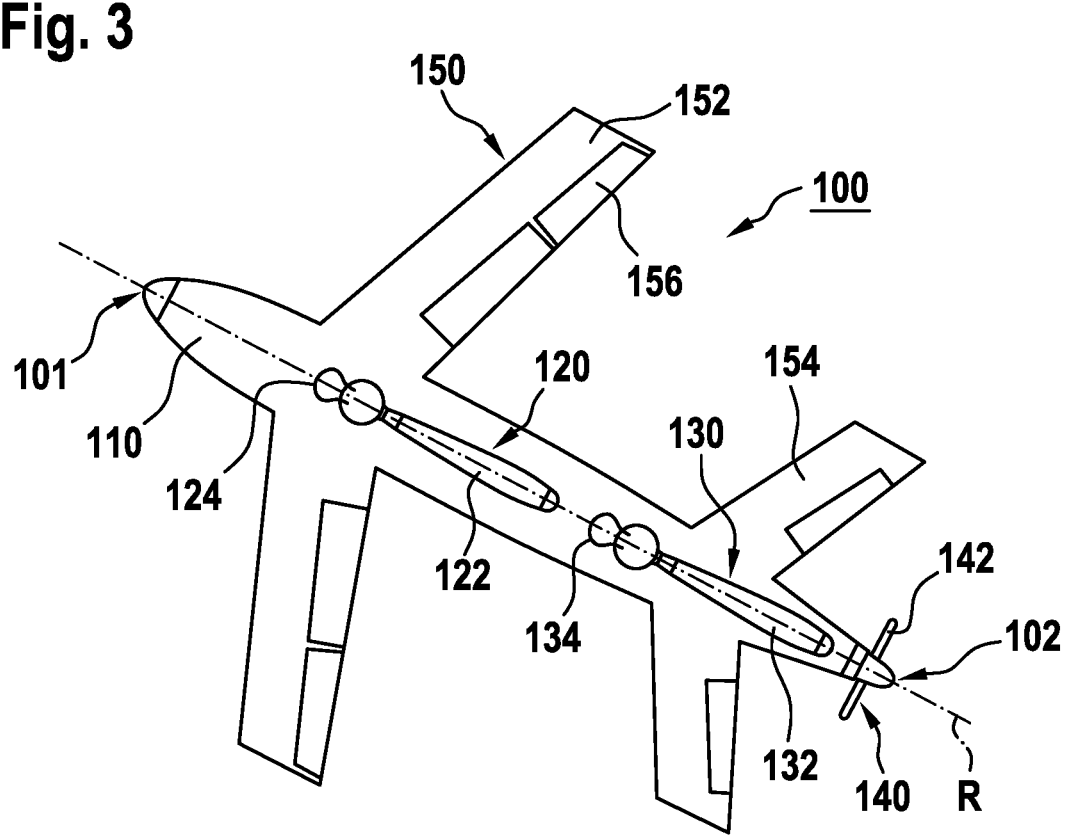
FIG. 3 shows a top view of the rotary wing aircraft of FIG. 1 and FIG. 2 in forward flight condition.

FIG. 3 shows the rotary wing aircraft 100 of FIG. 2 with the front rotor 120 having the single rotor blade 122 and the counterweight 124, the rear rotor 130 having the single rotor blade 132 and the counterweight 134, the propeller 142, the front wings 152, and the rear wings 154. However, in contrast to FIG. 2 the rotary wing aircraft 100 is shown in forward flight condition in FIG. 3, such that wing flaps 156 on the front wings 152 and the rear wings 154 are in forward flight positioning and, thus, visible in FIG. 3.

In the forward flight condition, the single rotor blades 122, 132 are preferably aligned with the roll axis R. In the context of the present disclosure, the expression "aligned with the roll axis R" refers to an orientation of the single rotor blades 122, 132 relative to the roll axis R such that a respective length axis of each one of the single rotor blades 122, 132 is oriented at least approximately in parallel to the roll axis R, i.e., longitudinally relative to the rotary wing aircraft's fuselage 110. This orientation should be such that the counterweights 124, 134 of the single rotor blades 122, 132 point toward the nose region 101 of the rotary wing aircraft 100 such that a minimum aerodynamic drag positioning of the single rotor blades 122, 132 is achieved. In any case, the expression "aligned with the roll axis R" refers to an alignment with minimum aerodynamic drag in the forward flight condition of the rotary wing aircraft 100.

Figure 4:
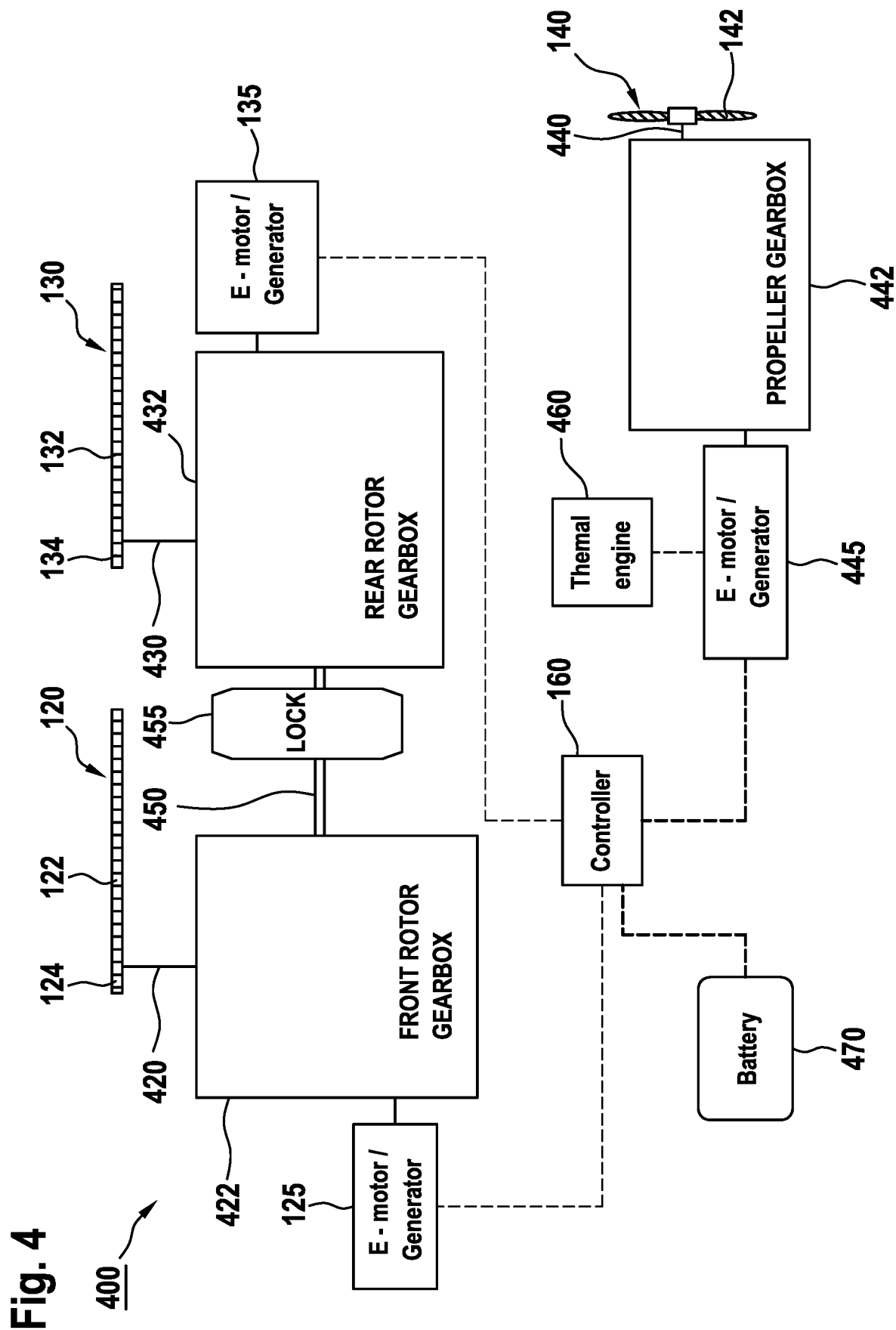
FIG. 4 shows a block diagram of a drive system of the rotary wing aircraft of FIG. 1 to FIG. 3.

FIG. 4 shows a drive system 400 of the rotary wing aircraft 100 of FIG. 1 to FIG. 3, which is provided for driving the front rotor 120, the rear rotor 130 and the propeller 142 of FIG. 2 and FIG. 3. Accordingly, the front rotor 120 comprises the single rotor blade 122 with the counterweight 124, and the rear rotor 130 comprises the single rotor blade 132 with the counterweight 134.

According to the present disclosure, the drive system 400 comprises at least one first electric machine 125 that is at least configured to drive, in motor mode, the front rotor 120, and at least one second electric machine 135 that is at least configured to drive, in motor mode, the rear rotor 130. Illustratively, the at least one first electric machine 125 associated with the front rotor 120 comprises a single electric machine and is, therefore, hereinafter referred to as "the front rotor electric machine 125", for simplicity and clarity. Likewise, the at least one second electric machine 135 associated with the rear rotor 130 also comprises a single electric machine and is, therefore, hereinafter referred to as "the rear rotor electric machine 135", for simplicity and clarity. At least the rear rotor electric machine 135 may preferably selectively be operated in motor mode or generator mode.

By way of example, the front rotor electric machine 125 is adapted to drive, in motor mode, a front gearbox 422 that, in turn, is provided for driving a front rotor drive shaft 420 of the front rotor 120. Similarly, the rear rotor electric machine 135 is adapted to drive, in motor mode, a rear gearbox 432 that, in turn, is provided for driving a rear rotor drive shaft 430 of the rear rotor 130. Preferably, the front rotor 120 and the rear rotor 130 are counterrotating in operation, as described above, and a respective counter-rotation is synchronized by means of a synchronizing shaft 450 which is provided for synchronizing operation of the front gearbox 422 and the rear gearbox 432. The synchronizing shaft 450 is preferably associated with a locking unit 455, which is illustratively mounted to the synchronizing shaft 450 and provided for locking the synchronizing shaft 450 in the forward flight condition of the rotary wing aircraft 100 according to FIG. 3 in an aligned position of the single rotor blade 122 of the front rotor 120 and the single rotor blade 132 of the rear rotor 130.

Moreover, the drive system 400 preferably further comprises at least one thermal engine 460 and at least one third electric machine 445 that is drivable using mechanical energy generated by the at least one thermal engine 460. Illustratively, the at least one third electric machine 445 comprises a single electric machine which is hereinafter referred to as "the main electric machine 445", for simplicity and brevity.

The main electric machine 445 may preferably selectively be operated in motor mode or generator mode. In the motor mode, the main electric machine 445 is preferably adapted to drive a propeller gearbox 442 that, in turn, is provided for driving a propeller drive shaft 440 of the propeller 142. In generator mode, the main electric machine 445 is preferably adapted to generate electrical energy from the mechanical energy generated by the at least one thermal engine 460 and to provide the electrical energy to the front rotor electric machine 125 and the rear rotor electric machine 135.

Furthermore, the drive system 400 is preferably equipped with a battery unit 470. The battery unit 470 is preferably at least useable in the forward flight condition of the rotary wing aircraft 100 according to FIG. 3 in order to supply electrical energy to the main electric machine 445 in case of a failure of the at least one thermal engine 460.

Moreover, the drive system 400 preferably comprises a flight control system 160 that is adapted to control operation of the rotary wing aircraft 100 of FIG. 1 to FIG. 3 and, more particularly, of the different components of the drive system 400. For simplicity and brevity, the flight control system 160 is also referred to hereinafter as "the controller 160". Preferably, the controller 160 is at least configured to control, in a transition phase from the hover condition of the rotary wing aircraft 100 according to FIG. 2 to the forward flight condition of the rotary wing aircraft 100 according to FIG. 3, the propeller 142 for generating forward thrust, and the front rotor electric machine 125 and the rear rotor electric machine 135 to operate in a closed loop configuration with the front rotor 120 and the rear rotor 130 for braking the front rotor 120 and the rear rotor 130 down to a rotation speed close to zero, as explained in more detail below with reference to FIG. 6.

Figure 5:
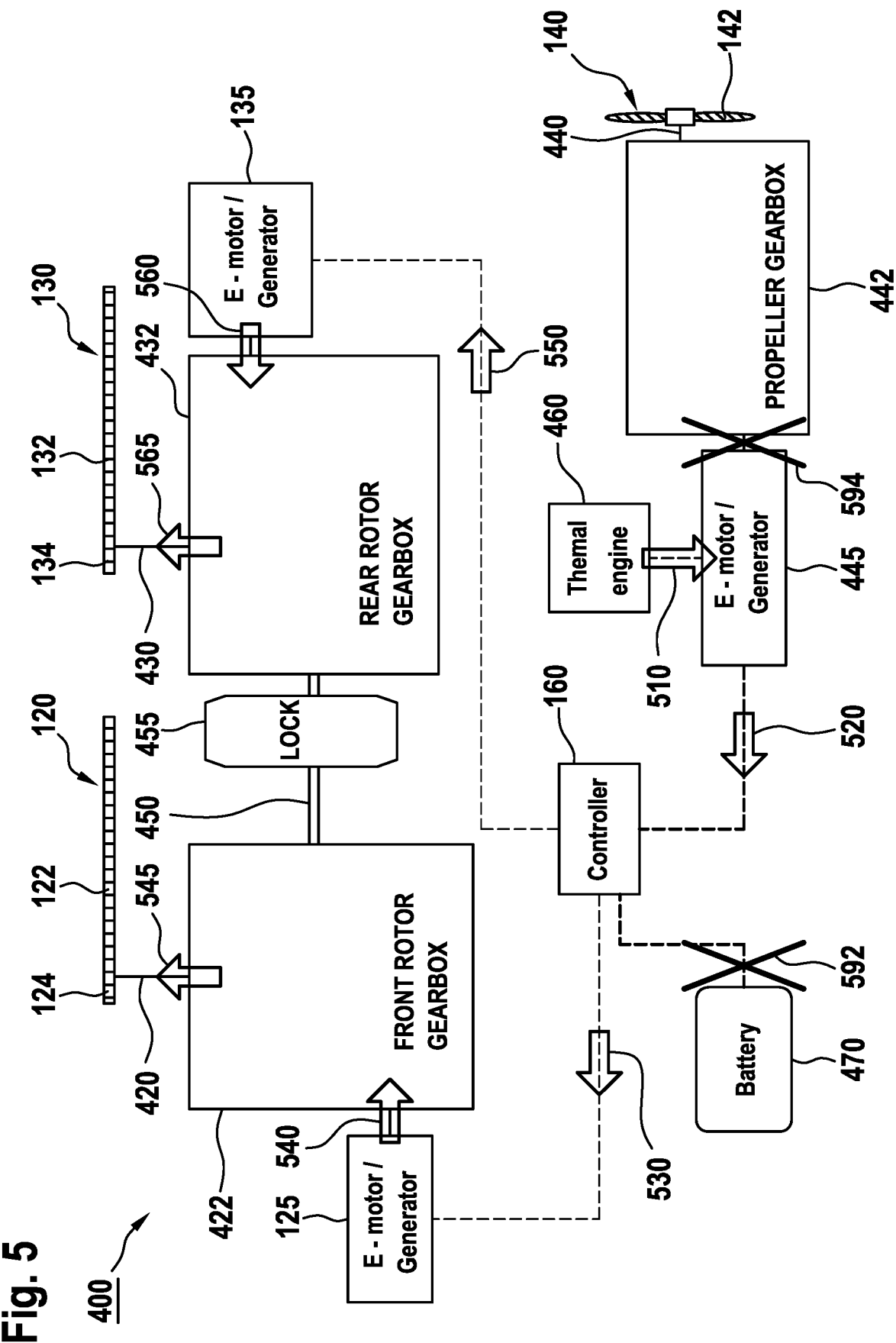
FIG. 5 shows a block diagram of the drive system of FIG. 4 with an illustrative power distribution in the hover condition according to FIG. 1 and FIG. 2.

FIG. 5 shows the drive system 400 of FIG. 4 with the front rotor 120, the front rotor electric machine 125, the rear rotor 130, the rear rotor electric machine 135, the front rotor drive shaft 420, the rear rotor drive shaft 430, the front gearbox 422, the rear gearbox 432, the synchronizing shaft 450, the locking unit 455, the controller 160, the at least one thermal engine 460, the main electric machine 445, the propeller 142, the propeller drive shaft 440, the propeller gearbox 442, and the battery unit 470. By way of example, FIG. 5 illustrates power distribution in the drive system 400 in hover condition of the rotary wing aircraft 100 according to FIG. 2.

More specifically, in the hover condition of the rotary wing aircraft 100 according to FIG. 2, the at least one thermal engine 460 preferably generates mechanical energy which is supplied to the main electric machine 445, as illustrated with an arrow 510. The main electric machine 445 is preferably controlled by the controller 160 to operate in generator mode to generate electrical energy from the supplied mechanical energy, as illustrated with an arrow 520.

Under the control of the controller 160, the generated electrical energy is supplied to the front rotor electric machine 125 and the rear rotor electric machine 135, as illustrated with arrows 530, 550. The front rotor electric machine 125 is preferably controlled by the controller 160 to operate in motor mode to drive the front gearbox 422, as illustrated by an arrow 540, and the rear rotor electric machine 135 is preferably controlled by the controller 160 to operate in motor mode to drive the rear gearbox 432, as illustrated by an arrow 560, wherein the front gearbox 422 and the rear gearbox 432 are synchronized by means of the synchronizing shaft 450. The front gearbox 422 drives the front rotor 120 for rotation about the front rotor drive shaft 420, as illustrated with an arrow 545, and the rear gearbox 432 preferably drives the rear rotor 130 for counter-rotation about the rear rotor drive shaft 430, as illustrated with an arrow 565.

However, in the hover condition the propeller gearbox 442 and the propeller 142 are preferably controlled by the controller 160 such that they are not driven by the main electric machine 445, as the latter is operated in generator mode. This is illustrated with a cross 594. Furthermore, the controller 160 preferably controls the battery unit 470 in hover condition such that the latter is not charged with the electrical energy generated by the main electric machine 445, as illustrated with a cross 592, such that this electrical energy may entirely be supplied to the front rotor electric machine 125 and the rear rotor electric machine 135.

Figure 6:
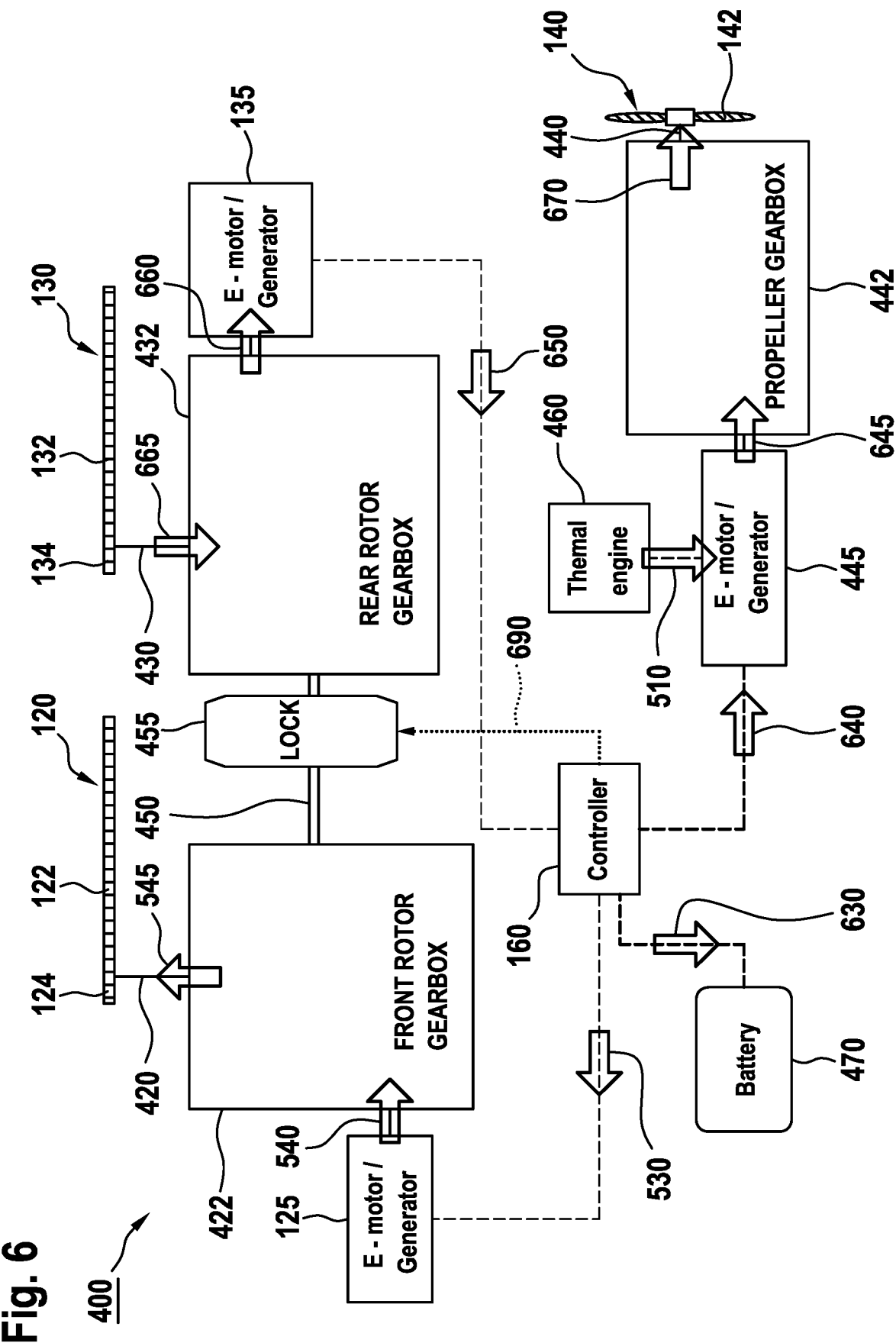
FIG. 6 shows a block diagram of the drive system of FIG. 4 with an illustrative power distribution in a transition phase from the hover condition according to FIG. 1 and FIG. 2 to the forward flight condition according to FIG. 3.

FIG. 6 shows the drive system 400 of FIG. 4 with the front rotor 120 having the single rotor blade 122, the front rotor electric machine 125, the rear rotor 130 having the single rotor blade 132, the rear rotor electric machine 135, the front rotor drive shaft 420, the rear rotor drive shaft 430, the front gearbox 422, the rear gearbox 432, the synchronizing shaft 450, the locking unit 455, the controller 160, the at least one thermal engine 460, the main electric machine 445, the propeller 142, the propeller drive shaft 440, the propeller gearbox 442, and the battery unit 470. By way of example, FIG. 6 illustrates power distribution in the drive system 400 in the transition phase from the hover condition of the rotary wing aircraft 100 according to FIG. 2, wherein the power is distributed in the drive system 400 as described above at FIG. 5, to the forward flight condition of the rotary wing aircraft 100 according to FIG. 3.

More specifically, in the transition phase, the at least one thermal engine 460 preferably generates mechanical energy which is supplied to the main electric machine 445, as illustrated with the arrow 510. The main electric machine 445 is preferably controlled by the controller 160 to operate in motor mode to drive the propeller gear box 442, as illustrated by an arrow 645, such that the propeller gear box 442 drives the propeller 142 to rotate about the propeller drive shaft 440, as illustrated with an arrow 670, in the transition phase, but also in the forward flight condition of the rotary wing aircraft 100 according to FIG. 3 afterwards.

Furthermore, under the control of the controller 160, preferably the rear rotor electric machine 135 is switched from the motor mode to generator mode for generating electrical energy from rotation of the rear rotor 130, as illustrated with arrows 665, 660, and 650. Moreover, the front rotor electric machine 125 is preferably controlled by the controller 160 to continue operation in the motor mode as described above at FIG. 5, but now using the electrical energy generated by the rear rotor electric machine 135 to drive the front gearbox 422, as illustrated by the arrows 530, 540, which, in turn, drives the front rotor 120 for rotation about the front rotor drive shaft 420, as illustrated with the arrow 545. Thus, the controller 160 controls the front rotor electric machine 125 and the rear rotor electric machine 135 to operate in a closed loop configuration with the front rotor 120 and the rear rotor 130.

Preferably, the controller 160 starts controlling the front rotor electric machine 125 and the rear rotor electric machine 135 to operate in a closed loop configuration with the front rotor 120 and the rear rotor 130 when the propeller 142 propels the rotary wing aircraft 100 of FIG. 1 and FIG. 2 with a forward thrust or cruise speed that is above a predetermined threshold such that the fixed-wing arrangement 150 of FIG. 1 and FIG. 2 accomplishes the lift duties, i.e., generates sufficient lift load. The front rotor electric machine 125 and the rear rotor electric machine 135 then preferably operate in the closed loop configuration with the front rotor 120 and the rear rotor 130 for braking the front rotor 120 and the rear rotor 130 down to a rotation speed close to zero.

After braking the front rotor 120 and the rear rotor 130 down to the rotation speed close to zero, the controller 160 preferably controls alignment of the single rotor blade 122 of the front rotor 120 and the single rotor blade 132 of the rear rotor 130 with the roll axis R of the rotary wing aircraft 100 according to FIG. 3. Therefore, the controller 160 preferably controls the front rotor electric machine 125 and the rear rotor electric machine 135 to operate in the motor mode such that the front rotor 120 and the rear rotor 130 may actively be driven via the front gearbox 125 and the rear gearbox 135 for rotation into respective minimum aerodynamic drag positions.

After aligning the single rotor blade 122 of the front rotor 120 and the single rotor blade 132 of the rear rotor 130 with the roll axis R of the rotary wing aircraft 100 according to FIG. 3, the controller 160 preferably controls the locking unit 455 for locking the single rotor blade 122 of the front rotor 120 and the single rotor blade 132 of the rear rotor 130 in their respective minimum aerodynamic drag positions. Therefore, the controller 160 preferably issues a locking command to the locking unit 455, as illustrated with an arrow 690, for locking the synchronizing shaft 450. Power distribution to the front rotor electric machine 125 and the rear rotor electric machine 135 is then preferably stopped.

Moreover, during the transition phase, excessively generated electrical energy from the rear rotor electric machine 135 may either be used for charging the battery unit 470, as illustrated by an arrow 630, and/or to further power the main electric machine 445 operating in the motor mode, as illustrated by an arrow 640.

Furthermore, it should be noted that modifications to the above-described realizations are also within the common knowledge of the person skilled in the art and, thus, also considered as being part of the present disclosure.

REFERENCE LIST

100 rotary wing aircraft
101 aircraft nose region
102 aircraft aft region
110 fuselage
120 front single-blade rotor
122 front rotor blade
124 front rotor blade counterweight
125 front electric machine
130 rear single-blade rotor
132 rear rotor blade
134 rear rotor blade counterweight
135 rear electric machine
140 propulsion device
142 propeller
150 fixed-wing arrangement
152 front wings
154 rear wings
156 wing flaps
160 flight control system
400 aircraft drive system
420 front rotor drive shaft
422 front rotor gearbox
430 rear rotor drive shaft
432 rear rotor gearbox
440 propeller drive shaft
442 propeller gearbox
445 main electric machine
450 synchronizing shaft
455 locking unit
460 thermal engine
470 battery unit
510, 520, 530, 540, 545, 550, 560, 565 power distribution
592, 594 component cut-off 630, 640, 645, 650, 660, 665 power distribution
690 locking command
R aircraft roll axis

What is claimed is:

1. A rotary wing aircraft that extends along a roll axis between a nose region and an aft region, comprising:
- at least one first single-blade rotor and at least one second single-blade rotor which are spaced apart from each other along the roll axis;
- at least one first electric machine and at least one second electric machine which are at least configured to drive in motor mode the at least one first single-blade rotor and the at least one second single-blade rotor for generating lift in hover condition of the rotary wing aircraft;
- at least one propulsion device that is at least configured to generate forward thrust in forward flight condition of the rotary wing aircraft;
- a fixed-wing arrangement that is at least configured to provide lift in the forward flight condition of the rotary wing aircraft; and
- a flight control system that is configured to control, in a transition phase from the hover condition to the forward flight condition:
- the at least one propulsion device for generating forward thrust, and
- the at least one first electric machine and the at least one second electric machine to operate in a closed loop configuration with the at least one first single-blade rotor and the at least one second single-blade rotor for braking the at least one first single-blade rotor and the at least one second single-blade rotor down to a rotation speed close to zero,
- wherein the at least one first electric machine is controlled for operation in the motor mode, wherein the at least one second electric machine is controlled for operation in generator mode, and wherein the at least one first electric machine in the motor mode is controlled for being driven with the generated electrical energy from the at least one second electric machine operating in the generator mode.

2. The rotary wing aircraft of claim 1,
wherein the at least one first single-blade rotor comprises a first single rotor blade and the at least one second single-blade rotor comprises a second single rotor blade, and wherein the flight control system is further configured to align the first single rotor blade and the second single rotor blade with the roll axis, after braking the at least one first single-blade rotor and the at least one second single-blade rotor down to the rotation speed close to zero.

3. The rotary wing aircraft of claim 2,
wherein the flight control system is further configured to activate a locking unit for locking the first single rotor blade and the second single rotor blade in the forward flight condition in an aligned position, after aligning the first single rotor blade and the second single rotor blade with the roll axis.

4. The rotary wing aircraft of claim 1, further comprising at least one first rotor gearbox, at least one second rotor gearbox, and a synchronizing shaft,
wherein the at least one first single-blade rotor is adapted to be driven via the at least one first rotor gearbox, the at least one second single-blade rotor is adapted to be driven via the at least one second rotor gearbox, and the synchronizing shaft is arranged between the at least one first rotor gearbox and the at least one second rotor gearbox for synchronizing counter-rotation of the at least one first single-blade rotor and the at least one second single-blade rotor.

5. The rotary wing aircraft of claim 3,
wherein the locking unit is mounted to the synchronizing shaft for locking the synchronizing shaft in the forward flight condition in the aligned position of the first single rotor blade and the second single rotor blade.

6. The rotary wing aircraft of claim 1, wherein the at least one second electric machine is configured to operate, in the transition phase, in the generator mode for generating electrical energy from rotation of the at least one second rotor.

7. The rotary wing aircraft of claim 1, further comprising at least one thermal engine and at least one third electric machine that is drivable using mechanical energy generated by the at least one thermal engine.

8. The rotary wing aircraft of claim 7,
wherein the flight control system is configured to control, in the hover condition, the at least one third electric machine for operation in generator mode for generation of electrical energy and supply of the generated electrical energy to the at least one first electric machine and the at least one second electric machine.

9. The rotary wing aircraft of claim 7,
wherein the flight control system is configured to control, in the transition phase and the forward flight condition, the at least one third electric machine for operation in motor mode for driving the at least one propulsion device.

10. The rotary wing aircraft of claim 1, further comprising a battery unit,
wherein the flight control system is configured to control, in the transition phase, charging of the battery unit with electrical energy generated by the at least one second electric machine operating in the generator mode.

11. The rotary wing aircraft of claim 7,
wherein the flight control system is configured to control, in the forward flight condition, supply of electrical energy from the battery unit to the at least one third electric machine operating in the motor mode in case of a failure of the thermal engine.

12. The rotary wing aircraft of claim 1,
wherein the at least one propulsion device comprises at least one propeller.

13. A method of operating a rotary wing aircraft that extends along a roll axis between a nose region and an aft region and that comprises at least one first single-blade rotor and at least one second single-blade rotor which are spaced apart from each other along the roll axis, at least one first electric machine and at least one second electric machine which are at least configured to drive in motor mode the at least one first single-blade rotor and the at least one second single-blade rotor for generating lift in hover condition of the rotary wing aircraft, at least one propulsion device that is at least configured to generate forward thrust in forward flight condition of the rotary wing aircraft, a fixed-wing arrangement that is at least configured to provide lift in the forward flight condition of the rotary wing aircraft, and a flight control system, the method comprising, in a transition phase from the hover condition to the forward flight condition, the steps of:
- controlling the at least one propulsion device for generating forward thrust, and
- controlling the at least one first electric machine and the at least one second electric machine to operate in a closed loop configuration with the at least one first single-blade rotor and the at least one second single-blade rotor for braking the at least one first single-blade rotor and the at least one second single-blade rotor down to a rotation speed close to zero, wherein controlling the at least one first electric machine and the at least one second electric machine to operate in the closed loop configuration comprises controlling the at least one first electric machine for operation in the motor mode, the at least one second electric machine for operation in generator mode, and driving of the at least one first electric machine in the motor mode with the generated electrical energy from the at least one second electric machine operating in the generator mode.

14. A rotary wing aircraft extending along a roll axis between a nose region and an aft region, the aircraft comprising:
- a first single-blade rotor and a second single-blade rotor which are spaced apart from each other along the roll axis;
- a first electric machine and a second electric machine configured to drive in a motor mode the first single-blade rotor and the second single-blade rotor for generating lift in hover condition of the rotary wing aircraft;
- a propulsion device configured to generate forward thrust in a forward flight condition of the rotary wing aircraft;
- a fixed-wing arrangement configured to provide lift in the forward flight condition of the rotary wing aircraft; and
- a flight control system configured to control, in a transition phase from the hover condition to the forward flight condition:
- the propulsion device for generating forward thrust, and
- the first electric machine and the second electric machine to operate in a closed loop configuration with the first single-blade rotor and the second single-blade rotor for braking the first single-blade rotor and the second single-blade rotor down to a rotation speed close to zero, wherein the at least one first electric machine is controlled for operation in the motor mode, wherein the at least one second electric machine is controlled for operation in generator mode, and wherein the at least one first electric machine in the motor mode is controlled for being driven with the generated electrical energy from the at least one second electric machine operating in the generator mode.

15. The rotary wing aircraft of claim 14,
wherein the first single-blade rotor comprises a first single rotor blade and the second single-blade rotor comprises a second single rotor blade, and wherein the flight control system is further configured to align the first single rotor blade and the second single rotor blade with the roll axis, after braking the first single-blade rotor and the second single-blade rotor down to the rotation speed close to zero.

16. The rotary wing aircraft of claim 15,
wherein the flight control system is further configured to lock the first single rotor blade and the second single rotor blade in the forward flight condition in an aligned position, after aligning the first single rotor blade and the second single rotor blade with the roll axis.

17. The rotary wing aircraft of claim 14, further comprising a first rotor gearbox, a second rotor gearbox, and a synchronizing shaft,
wherein the first single-blade rotor is adapted to be driven via the first rotor gearbox, the second single-blade rotor is adapted to be driven via the second rotor gearbox, and the synchronizing shaft is arranged between the first rotor gearbox and the second rotor gearbox for synchronizing counter-rotation of the first single-blade rotor and the second single-blade rotor.

18. The rotary wing aircraft of claim 14,
wherein the propulsion device comprises at least one propeller.

19. The rotary wing aircraft of claim 1, wherein the at least one first single-blade rotor is positioned closer to the nose region than the aft region and the at least one second single-blade rotor is positioned closer to the aft region than the nose region and wherein the at least one first single-blade rotor and the at least one second single-blade rotor are capable of counterrotating such that respective torques generated by the at least one first single-blade rotor and the at least one second single-blade rotor are oppositely directed.

* * * * *